(12) United States Patent
Yagasaki et al.

(10) Patent No.: US 8,672,097 B2
(45) Date of Patent: Mar. 18, 2014

(54) LUBRICATION DEVICE FOR BELT TYPE CONTINUOUSLY VARIABLE TRANSMISSION

(75) Inventors: Toru Yagasaki, Wako (JP); Masaru Sora, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 221 days.

(21) Appl. No.: 12/672,339

(22) PCT Filed: Sep. 11, 2008

(86) PCT No.: PCT/JP2008/066389
§ 371 (c)(1),
(2), (4) Date: Feb. 5, 2010

(87) PCT Pub. No.: WO2009/038009
PCT Pub. Date: Mar. 26, 2009

(65) Prior Publication Data
US 2011/0183792 A1 Jul. 28, 2011

(30) Foreign Application Priority Data
Sep. 18, 2007 (JP) .................................. 2007-241064

(51) Int. Cl.
*F16H 57/04* (2010.01)
*F16H 55/56* (2006.01)

(52) U.S. Cl.
USPC ......................................................... 184/15.1

(58) Field of Classification Search
USPC ........................... 184/6.19, 15.1, 15.3; 474/43
See application file for complete search history.

(56) References Cited

U.S. PATENT DOCUMENTS 5,033,989 A * 7/1991 Shimaguchi ........................ 474/8
5,230,664 A * 7/1993 Michioka et al. .................. 474/43

(Continued)

FOREIGN PATENT DOCUMENTS

EP 1031764 A1 8/2000
EP 1162390 A1 12/2001

(Continued)

OTHER PUBLICATIONS

International Search Report of PCT/JP2008/066389, mailing date of Oct. 14, 2008.
Supplementary European Search Report, dated Feb. 14, 2011, issued in corresponding European Patent Application No. 08831770.

*Primary Examiner* — William E Dondero
*Assistant Examiner* — Mark K Buse
(74) *Attorney, Agent, or Firm* — Westerman, Hattori, Daniels & Adrian, LLP

(57) ABSTRACT

A lubrication device for a belt type continuously variable transmission is provided in which a nozzle tube (25) communicating with an oil supply source (26) is disposed between a drive pulley (5) and a driven pulley (6) of a belt type continuously variable transmission (2) along the axial direction of the drive pulley (5) and the driven pulley (6), this nozzle tube (25) being provided with first and second oil spray holes (27, 28) for spraying oil toward belt grooves (12, 21) of the two pulleys (5, 6) respectively, wherein the first oil spray hole (27) is made to be open toward a large-diameter portion of a belt contact face (21*a*) of a fixed pulley half body (19) of the one, of the drive pulley (5) and the driven pulley (6), that is positioned on an upstream side of the nozzle tube (25), and the second oil spray hole (28) is made to be open toward the belt groove (12) of the other of the drive pulley (5) and the driven pulley (6) at a position downstream of the nozzle tube (25) relative to the first oil spray hole (27). This enables lubrication and cooling of a V belt on the drive and driven pulley sides to be carried out reliably even when the angles of the first and second oil spray holes relative to the axis of the nozzle tube are identical to each other.

4 Claims, 3 Drawing Sheets

(56) References Cited

U.S. PATENT DOCUMENTS

| | | | |
|---|---|---|---|
| 5,605,513 A * | 2/1997 | Van Der Hardt Aberson | 474/43 |
| 6,626,781 B2 * | 9/2003 | Van Der Kamp et al. | 474/91 |
| 7,125,355 B2 * | 10/2006 | Schmidt et al. | 474/91 |
| 7,438,659 B2 * | 10/2008 | Kim et al. | 474/91 |
| 2004/0082416 A1 * | 4/2004 | Schmidt et al. | 474/91 |
| 2011/0183792 A1 * | 7/2011 | Yagasaki et al. | 474/43 |

FOREIGN PATENT DOCUMENTS

| | | |
|---|---|---|
| JP | 62-159846 A | 7/1987 |
| JP | 6-50400 A | 2/1994 |
| JP | 7-14251 U | 3/1995 |
| JP | 10-141459 A | 5/1998 |
| WO | 98/20269 A1 | 5/1998 |

\* cited by examiner

LUBRICATION DEVICE FOR BELT TYPE CONTINUOUSLY VARIABLE TRANSMISSION

TECHNICAL FIELD

The present invention relates to an improvement of a lubrication device for a belt type continuously variable transmission in which a nozzle tube communicating with an oil supply source is disposed between a drive pulley and a driven pulley of a belt type continuously variable transmission along the axial direction of the drive pulley and the driven pulley, this nozzle tube being provided with first and second oil spray holes for spraying oil toward V-shaped cross-section belt grooves of the drive and driven pulleys respectively so that, in particular, lubrication and cooling of a V belt engaging with the belt grooves of the two pulleys are carried out.

BACKGROUND ART

Such a lubrication device for a belt type continuously variable transmission is already known, as disclosed in, for example, Patent Document 1.
Patent Document 1: Japanese Patent Application Laid-open No. 6-50400

DISCLOSURE OF INVENTION

Problems to be Solved by the Invention

In the arrangement disclosed in Patent Document 1, it is desirable that, since oil is directed in a predetermined direction from an oil spray hole of a nozzle tube, the oil spray hole is provided in a thick portion of the nozzle tube that has a thickness of at least 2 mm. When a first oil spray hole and a second oil spray hole are disposed so as to be displaced from each other in the axial direction of the nozzle tube, since the oil spray angles from the oil spray holes are different on an upstream side and a downstream side of the nozzle tube, it is necessary to individually set an angle for the first and second oil spray holes relative to the axis of the nozzle tube according to this difference. Hole making for the first and second oil spray holes therefore becomes troublesome and this, coupled with the necessity for a thick nozzle tube, makes it difficult to reduce the cost.

The present invention has been accomplished in light of such circumstances, and it is an object thereof to provide a lubrication device for a belt type continuously variable transmission that enables lubrication and cooling of a V belt on drive and driven pulley sides to be reliably carried out even if a thin nozzle tube is employed and the angles of first and second oil spray holes relative to the axis of the nozzle tube are made identical to each other.

Means for Solving the Problems

In order to attain the above object, according to an aspect of the present invention, there is provided a lubrication device for a belt type continuously variable transmission in which a nozzle tube communicating with an oil supply source is disposed between a drive pulley and a driven pulley of the belt type continuously variable transmission along the axial direction of the drive pulley and the driven pulley, this nozzle tube being provided with first and second oil spray holes for spraying oil toward V-shaped cross-section belt grooves of the drive and driven pulleys respectively, characterized in that the first oil spray hole is made to be open toward a large-diameter portion of a belt contact face of a fixed pulley half body of the one, of the drive pulley and the driven pulley, that is positioned on an upstream side of the nozzle tube, and the second oil spray hole is made to be open toward the belt groove of the other of the drive pulley and the driven pulley at a position downstream of the nozzle tube relative to the first oil spray hole.

Effects of the Invention

In accordance with the present invention, in the first oil spray hole on the upstream side, oil sprayed from the first oil spray hole can be supplied from the large-diameter portion toward the small-diameter portion along the conical belt contact face of one fixed pulley half body by utilizing the influence of the flow of oil within the nozzle tube; furthermore, in the second oil spray hole on the downstream side, oil can be supplied over a wide range of the belt groove of the other pulley by utilizing the increased divergence angle of oil sprayed from the second oil spray hole, and it is therefore possible to reliably carry out lubrication and cooling of the V belt in the two pulleys. This eliminates the necessity for imparting to the first and second oil spray holes a function of guiding sprayed oil, and it therefore becomes possible to use a thin nozzle tube and make the angles of the first and second oil spray holes relative to the axis of the nozzle tube identical to each other, thus cutting the materials cost and making hole machining easy, thereby reducing the cost.

EXPLANATION OF REFERENCE NUMERALS AND SYMBOLS

Figure 1:
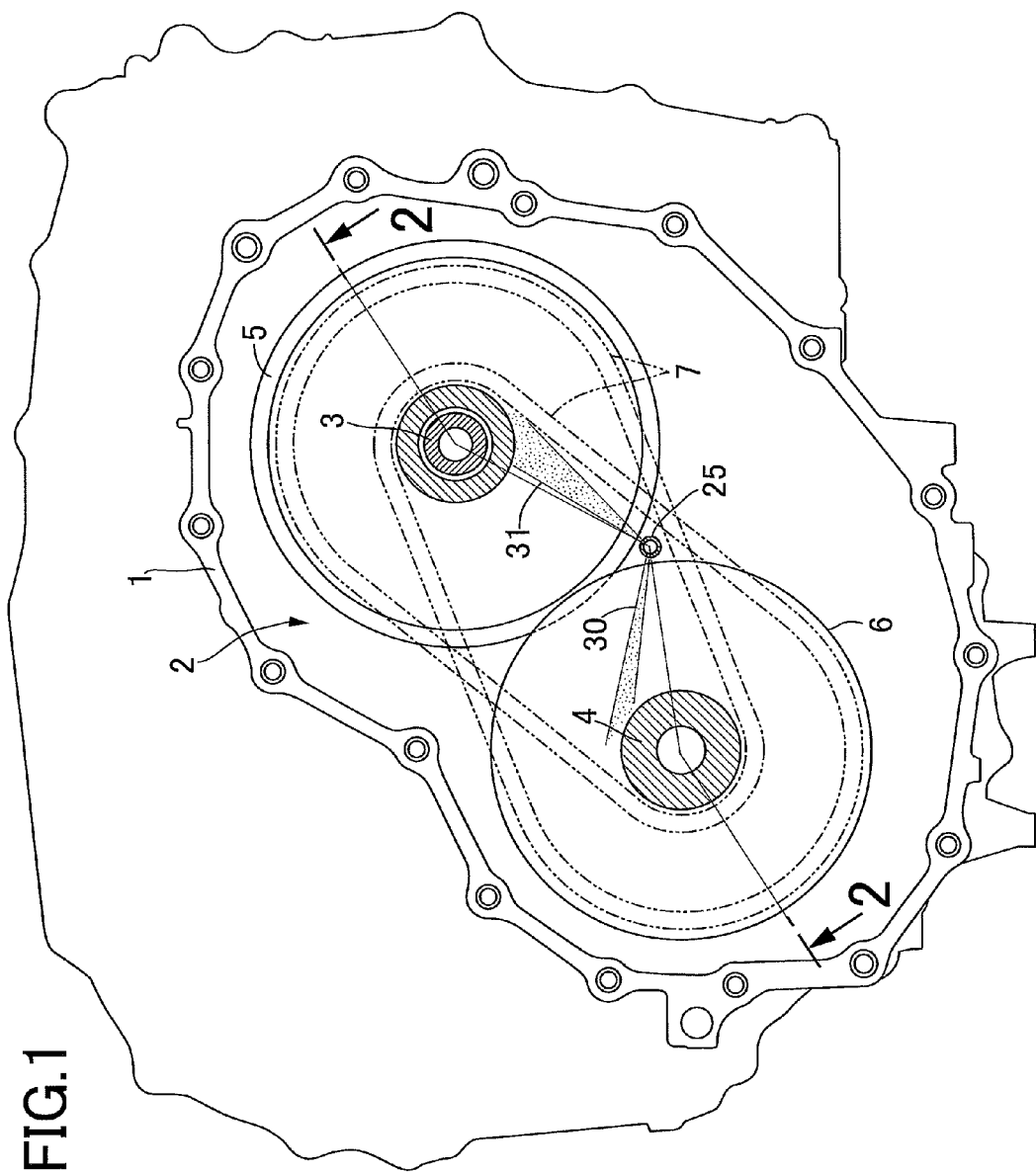
FIG. 1 is a side view of a belt type continuously variable transmission for an automobile equipped with the lubrication device of the present invention. (first embodiment)

2 Belt type continuously variable transmission
5 Drive pulley
6 Driven pulley
7 V belt
12 Belt groove of drive pulley
21 Belt groove of driven pulley
25 Nozzle tube
26 Oil supply source
27 First oil spray hole
28 Second oil spray hole

BEST MODE FOR CARRYING OUT THE INVENTION

A mode for carrying out the present invention is explained below by reference to a preferred embodiment of the present invention shown in the attached drawings.

Embodiment 1

Figure 2:
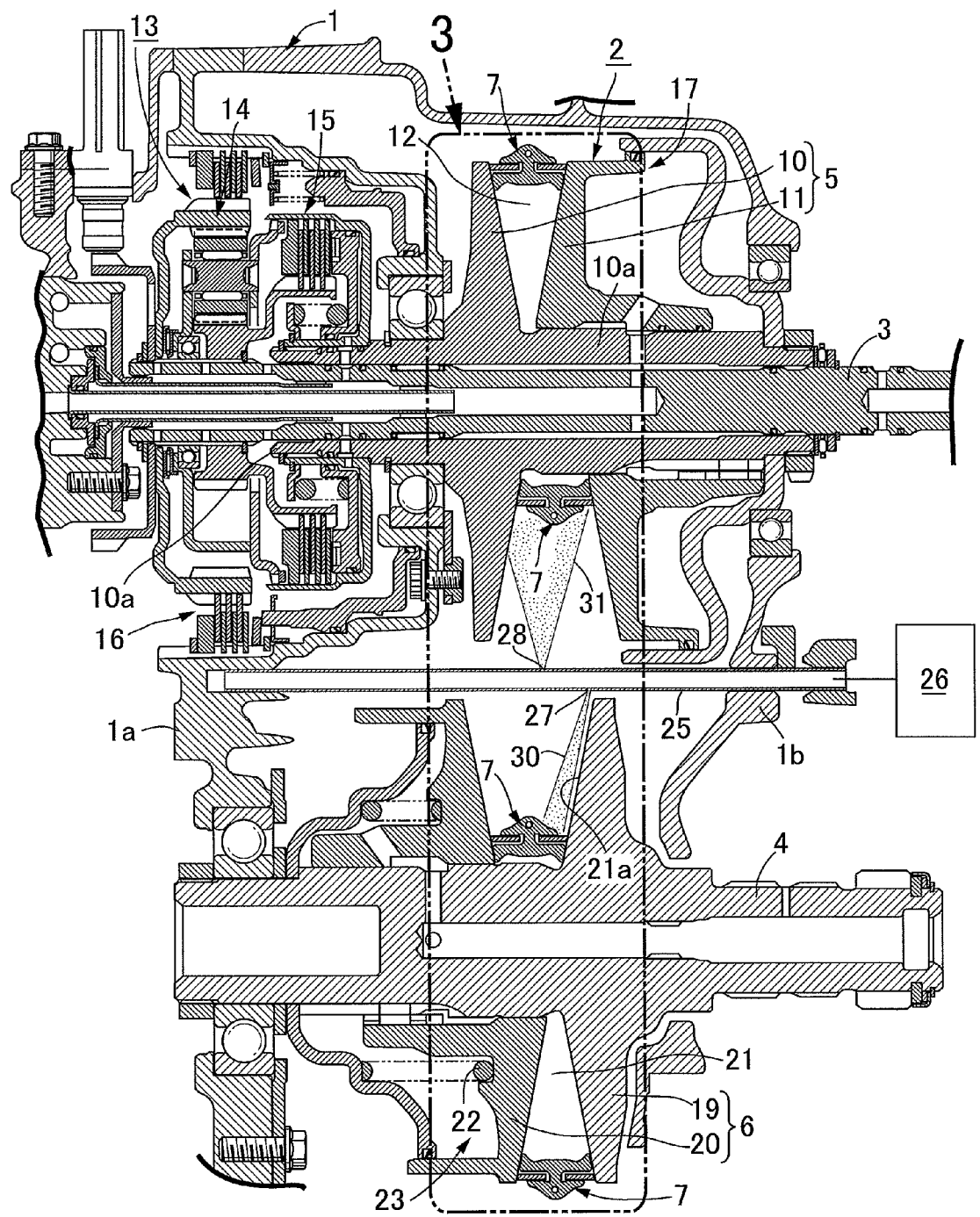
FIG. 2 is a sectional view along line 2-2 in FIG. 1. (first embodiment)

In FIG. 1 and FIG. 2, a belt type continuously variable transmission 2 is housed within a transmission case 1 of a power unit mounted on an automobile. This belt type continuously variable transmission 2 includes an input shaft 3 and an output shaft 4 rotatably supported on the transmission case 1 so as to be parallel to each other, a drive pulley 5 mounted on the input shaft 3, a driven pulley 6 mounted on the output shaft 4, and a V belt 7 made of metal wound around the input and output shafts 3 and 4, the input shaft 3 being connected to an output section of an engine, which is not illustrated, and the output shaft 4 being connected to a multistage auxiliary transmission, which is not illustrated.

The drive pulley 5 is formed from a fixed pulley half body 10 that integrally has a tubular shaft 10a rotatably supported on the input shaft 3, and a movable pulley half body 11 that is axially slidably and relatively non-rotatably supported on the tubular shaft 10a and forms, together with the fixed pulley half body 10, a V-shaped cross-section belt groove 12, a forward/reverse switching device 13 being provided between the input shaft 3 and the tubular shaft 10a. This forward/reverse switching device 13 is formed from a planetary gear mechanism 14, a forward clutch 15, and a reverse brake 16; when the forward clutch 15 is connected, the input shaft 3 and the tubular shaft 10a, that is, the input shaft 3 and the fixed pulley half body 10, are directly connected, and when the reverse brake 16 is operated, rotation of the input shaft 3 is slowed down, reversed, and transmitted to the fixed pulley half body 10.

Furthermore, provided between the tubular shaft 10a and the movable pulley half body 11 is a first hydraulic actuator 17 that can steplessly shift the movable pulley half body 11 along the axial direction.

The driven pulley 6 is formed from a fixed pulley half body 19 that is integrally formed on the output shaft 4, and a movable pulley half body 20 that is axially slidably and relatively non-rotatably supported on the output shaft 4 and forms, together with the fixed pulley half body 19, a V-shaped cross-section belt groove 21.

In the above-mentioned arrangement, the fixed pulley half bodies 10 and 19 and the movable pulley half bodies 11 and 20 are each disposed on diagonal lines.

The V belt 7 is wound around the drive and driven pulleys 5 and 6 so as to engage with the belt grooves 12 and 21, and a return spring 22 urging the movable pulley half body 20 toward the fixed pulley half body 19 side in order to impart to the V belt 7 a fixed tension is provided in a compressed state between the movable pulley half body 20 and the output shaft 4. Furthermore, a second hydraulic actuator 23 for controlling axial movement of the movable pulley half body 20 is provided between the movable pulley half body 20 and the output shaft 4.

In accordance with control of the first and second hydraulic actuators 17 and 23, if the movable pulley half body 11 is moved away from the fixed pulley half body 10 in the drive pulley 5 and at the same time the movable pulley half body 20 is moved closer to the fixed pulley half body 19 in the driven pulley 6, the V belt 7 thereby moves toward the small diameter side of the belt groove 12 of the drive pulley 5 and also moves toward the large diameter side of the belt groove 21 of the driven pulley 6 (see lower halves of the pulleys 5 and 6 in FIG. 2), and the gear ratio between the drive and driven pulleys 5 and 6 can therefore be changed to the LOW side; if the movable pulley half body 11 is moved closer to the fixed pulley half body 10 in the drive pulley 5 and at the same time the movable pulley half body 20 is moved away from the fixed pulley half body 19 in the driven pulley 6, the V belt 7 thereby moves toward the large diameter side of the belt groove 12 of the drive pulley 5 and also moves toward the small diameter side of the belt groove 21 of the driven pulley 6 (see upper halves of the pulleys 5 and 6 in FIG. 2), and the gear ratio between the drive and driven pulleys 5 and 6 can therefore be changed to the OD side.

Figure 3:
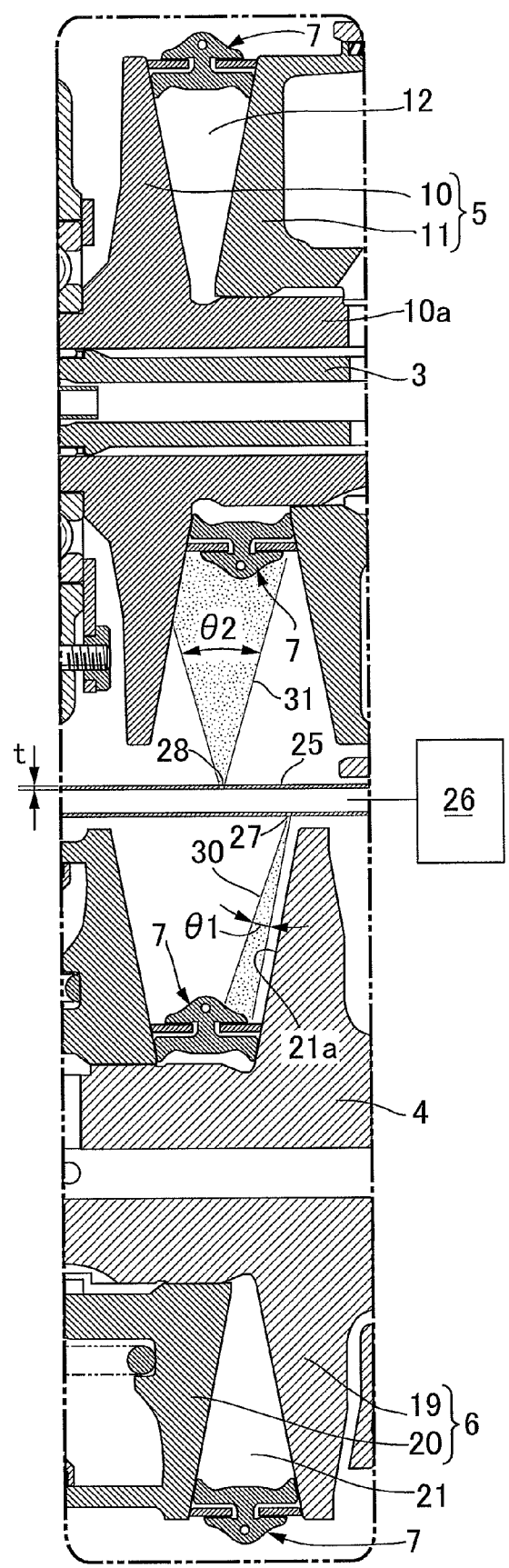
FIG. 3 is an enlarged view of part 3 in FIG. 2. (first embodiment)

In FIG. 2 and FIG. 3, a nozzle tube 25 supported on left and right side walls 1a and 1b of the transmission case 1 is disposed between the drive and driven pulleys 5 and 6 along the axial direction of the drive and driven pulleys 5 and 6. One end part of the nozzle tube 25 extends through the right side wall 1b and is connected to an oil supply source 26 such as an oil pump, and the other end part thereof is blocked by the left side wall 1a, which supports it.

This nozzle tube 25 is thin, such that a thickness t of its peripheral wall is for example 0.5 mm, and the peripheral wall has a first oil spray hole 27 and a second oil spray hole 28 bored therein in a direction perpendicular to the axis of the nozzle tube 25, the second oil spray hole 28 being offset from the first oil spray hole 27 toward the downstream side of the nozzle tube 25 (the side opposite to the oil supply source 26). That is, the two oil spray holes 27 and 28 are bored in the peripheral wall of the nozzle tube 25 at the same angle.

In this arrangement, the first oil spray hole 27 is disposed so as to open toward a large-diameter portion of a conical belt contact face 21a of the fixed pulley half body of the one, of the drive pulley 5 and the driven pulley 6, that is positioned on an upstream side of the nozzle tube 25, in the illustrated example the fixed pulley half body 19 on the driven side, and the second oil spray hole 28 positioned on the downstream side of the nozzle tube 25 is thereby positioned so as to open toward the other one of the drive pulley 5 and the driven pulley 6, in the illustrated example the belt groove 12 of the drive pulley 5.

The operation of this embodiment is now explained.

While the belt type continuously variable transmission 2 is in operation, when oil is fed under pressure from the oil supply source 26 to the nozzle tube 25, oil 30 is sprayed from the first oil spray hole 27 of the nozzle tube 25 toward the belt groove 21 of the driven pulley 6, and oil 31 is sprayed from the second oil spray hole 28 toward the belt groove 12 of the drive pulley 5. In this arrangement, since the first oil spray hole 27 is disposed on the upstream side of the nozzle tube 25 relative to the second oil spray hole 28, that is, at a position closer to the oil supply source 26, the spray direction of oil sprayed from the first oil spray hole 27 is strongly influenced by the flow of oil within the nozzle tube 25 and is inclined from the central line of the first oil spray hole 27 toward the downstream side of the nozzle tube 25. Since the first oil spray hole 27 is disposed so as to open toward the large-diameter portion of the conical belt latching face 21a of the fixed pulley half body of the one, of the drive pulley 5 and the driven pulley 6, that is positioned on the upstream side of the nozzle tube 25, in the illustrated example the fixed pulley half body 19 on the driven side, the spray direction of the oil 30 from the first oil spray hole 27 becomes substantially parallel to the conical belt latching face 21a, as a result the oil 30 can be sprayed from the first oil spray hole 27 along the conical belt latching face 21a from its large-diameter portion to its small-diameter portion, and lubrication and cooling of the V belt 7 can therefore be carried out efficiently all the time at any shift position of the V belt 7 on the driven pulley 6 side.

On the other hand, in the second oil spray hole 28, which is disposed on the downstream side of the nozzle tube 25 relative to the first oil spray hole 27, since the spray pressure of oil is reduced, the spray direction of the oil 31 from the second oil spray hole 28 is hardly affected by the flow of oil within the nozzle tube 25, and the spray direction of the oil 31 substantially coincides with the direction of the central line of the second oil spray hole 28; moreover, since a divergence angle θ2 of the oil 31 sprayed therefrom is larger than a divergence angle θ1 of the oil 30 sprayed from the first oil spray hole 27, the oil 31 can be supplied over a wide range with the position targeted by the second oil spray hole 28 as the center, and lubrication and cooling of the V belt 7 can thereby be carried out efficiently all the time on the drive pulley 5 side also.

In this way, since lubrication and cooling of the V belt 7 are reliably carried out in the two pulleys 5 and 6 by utilizing the influence of the flow of oil within the nozzle tube 25 in the first oil spray hole 27 on the upstream side and by utilizing the increase in the divergence angle θ2 of the sprayed oil 31 in the second oil spray hole 28 on the downstream side, it is unnecessary to impart to the first and second oil spray holes 27 and 28 the function of guiding sprayed oil, it becomes possible to make the angles of the first and second oil spray holes 27 and 28 relative to the axis of the nozzle tube 25 identical to each other, that is, 90°, by using the thin nozzle tube 25, and the materials cost can be cut and machining of the holes can be made easy, thus reducing the cost.

The present invention is not limited to the above-mentioned embodiment and may be modified in a variety of ways as long as the modifications do not depart from the spirit and scope thereof. For example, in FIG. 2 and FIG. 3, when the left end side of the nozzle tube 25 is connected to the oil supply source 26, the first oil spray hole 27 is disposed on the left side, the second oil spray hole 28 is disposed on the right side, the first oil spray hole 27 is made to be open toward the large-diameter portion of the belt contact face of the fixed pulley half body 10 on the drive side, and the second oil spray hole 28 is made to be open toward the belt groove 21 of the driven pulley 6.

The invention claimed is:

1. A lubrication device for a belt type continuously variable transmission, comprising:
    a belt type continuously variable transmission, comprising a drive pulley and a driven pulley, each of the drive pulley and the driven pulley including a fixed pulley half body and a movable pulley half body,
    an oil supply source,
    a nozzle tube communicating with the oil supply source, the nozzle tube being disposed between the drive pulley and the driven pulley along an axial direction of the drive pulley and the driven pulley, the nozzle tube including first and second oil spray holes for spraying oil toward V-shaped cross-section belt grooves of the drive pulley and driven pulley respectively,
    wherein the first oil spray hole is open toward a large-diameter portion of a belt contact face of the fixed pulley half body of the one of the drive pulley and the driven pulley that is positioned on an upstream side of the nozzle tube,
    wherein the second oil spray hole is open toward the belt groove of the other of the drive pulley and the driven pulley, at a position downstream of the nozzle tube relative to the first oil spray hole,
    wherein the first oil spray hole and the second oil spray hole are bored in the nozzle tube respectively in a direction perpendicular to an axis of the nozzle tube,
    wherein the first oil spray hole and the large-diameter portion of the belt contact face of the associated fixed pulley half body are located at a substantially same position in the axial direction of the nozzle tube,
    wherein an inner diameter of the nozzle tube is unchanged between the first and second oil spray holes, and
    wherein the nozzle tube has a first open end and a second open end which are respectively supported by a hole fully penetrating a first wall of the belt type continuously variable transmission and a hole partially penetrating a second wall of the belt type continuously variable transmission, the first open end communicating with the oil supply source, and the second open end being inserted into the hole partially penetrating the second wall.

2. The lubrication device for a belt type continuously variable transmission according to claim 1, wherein
    a spray direction of oil sprayed from the second oil spray hole substantially coincides with a direction perpendicular to the axis of the nozzle tube.

3. The lubrication device for a belt type continuously variable transmission according to claim 1, wherein
    a divergence angle (θ2) of oil sprayed from the second oil spray hole is larger than a divergence angle (θ1) of oil sprayed from the first oil spray hole.

4. The spray inclining means according to claim 1, wherein a thickness of a peripheral wall of the nozzle tube is 0.5 mm.

* * * * *